Figure 1:
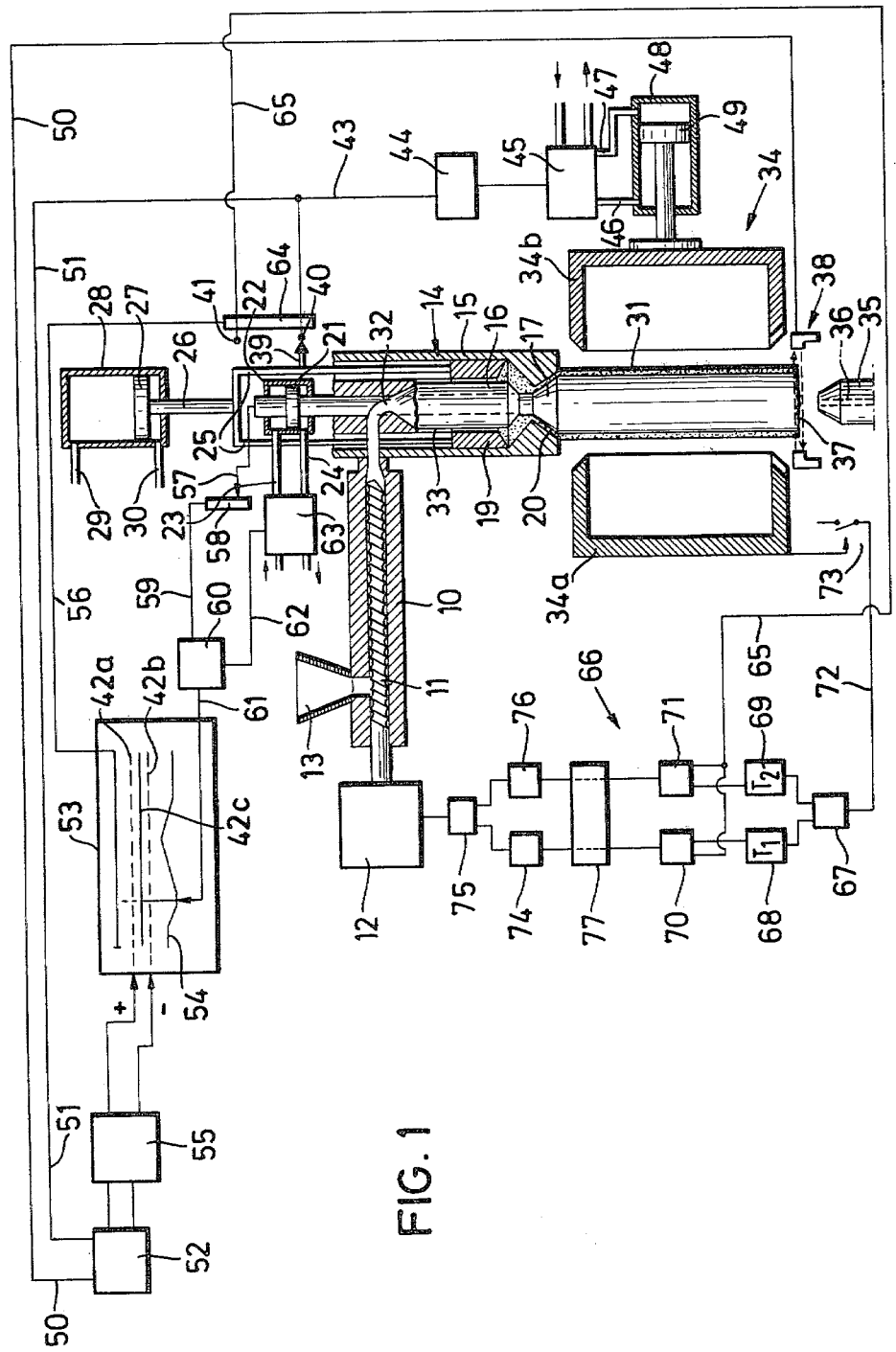

United States Patent [19]

Daubenbüchel et al.

[11] 4,338,071
[45] Jul. 6, 1982

[54] APPARATUS FOR THE MANUFACTURE OF HOLLOW BODIES FROM A THERMOPLASTIC BY THE BLOW-MOULDING PROCESS

[75] Inventors: Werner Daubenbüchel, Bensberg-Refrath; Alfred Thomas, Dambroich, both of Fed. Rep. of Germany

[73] Assignee: Kautex-Maschinenbau GmbH, Bonn-Holzlar, Fed. Rep. of Germany

[21] Appl. No.: 114,244

[22] Filed: Jan. 22, 1980

Related U.S. Application Data

[63] Continuation of Ser. No. 728,620, Oct. 1, 1976, abandoned.

[30] Foreign Application Priority Data

Oct. 6, 1975 [DE] Fed. Rep. of Germany ....... 2544609

[51] Int. Cl.³ .............................................. B29C 17/07
[52] U.S. Cl. ................................... 425/140; 425/145; 425/147; 425/532; 425/466; 264/40.1; 264/40.2; 264/40.4; 264/40.7
[58] Field of Search ............... 425/140, 145, 147, 381, 425/466, 532; 264/40.1, 40.2, 40.4, 40.7

[56] References Cited

U.S. PATENT DOCUMENTS

| | | | |
|---|---|---|---|
| 3,712,772 | 1/1973 | Hunkar | 425/381 X |
| 3,759,648 | 9/1973 | Hunkar | 425/140 |
| 3,865,528 | 2/1975 | Roess | 425/381 X |
| 3,985,490 | 10/1976 | Kader | 425/381 |

FOREIGN PATENT DOCUMENTS 2135037 1/1973 Fed. Rep. of Germany.

Primary Examiner—Jan H. Silbaugh
Attorney, Agent, or Firm—Laurence R. Brown

[57] ABSTRACT

Blow-moulding apparatus for the manufacture of hollow bodies from a thermoplastic in which a screw extruder extrudes the thermoplastic into an accumulating chamber, and a piston forces the thermoplastic through a gap-like outlet orifice of the accumulator chamber to form a parison. A blow-mould consisting of at least two parts which can be opened is positioned so that the blow-mould encompasses the parison. Control means are provided for adjusting the width of the gap-like outlet orifice of the accummulator chamber as a function of the length of the parison extruded, which length can be detected e.g. by a light beam and a photo-cell.

6 Claims, 3 Drawing Figures

APPARATUS FOR THE MANUFACTURE OF HOLLOW BODIES FROM A THERMOPLASTIC BY THE BLOW-MOULDING PROCESS

This a continuation of applicaton Ser. No. 728,620, filed Oct. 1, 1976 now abandoned.

The present invention relates to blow moulding apparatus for the manufacture of hollow bodies from a thermoplastic.

One form of such apparatus comprises an extruder and an extrusion head for the production of the parisons, and a blow-mould in which these parisons are blown, using a pressure medium, the extrusion head being provided with an inlet orifice, an accummulator chamber which can be emptied by means of a piston, and a gap-like outlet orifice for the thermoplastic. This outlet orifice is in the shape of an annular gap where tubular parisons are being produced. Since this is the commonest application in practice, the text which follows will throughout pre-suppose the production of a tubular parison and an accumulator chamber of corresponding construction, as well as an annular outlet gap. However, the invention is also applicable to parisons of other shape, for example in conjunction with the extrusion of strand-like or sheet-like parisons, and in that case, again, different shapes of cross-section are feasible.

The use of an extrusion head with an accumulator chamber, as disclosed, for example, in U.S. Pat. No. 3,611,494 has the consequence that the material issues discontinuously from the outlet orifice, essentially under the action of a piston which empties the accumulator chamber. At the same time, a small part of the material which forms the parison will also originate directly from the extruder upstream from the extrusion head, which extruder, for example, runs continuously in the case of the apparatuses according to the above-mentioned publication, and thus also feeds material into the extrusion head during the expulsion process which causes the formation of the parison.

In every case, that is to say regardless of whether the material forming the parison originates exclusively from the accumulator chamber or partly also issues from the extrusion head directly as the material comes from the extruder, it is, in practice, hardly possible accurately to maintain the length of the parison, even if the volume of the accumulator chamber is constant. This is essentially attributable to changes in the swelling characteristics of the material immediately after it passes the outlet orifice of the extrusion head.

To produce a perfect end product, for example a bottle, a canister or the like, it is essential that the parison extruded from the extrusion head should possess a certain minimum length. On the other hand, the length should not be too great, since otherwise more material than necessary is consumed. In the case of the customary blow-moulds, the excess material is pinched off by the blow-mould and/or by the device for introducing the pressure medium, for example a blowing mandrel. If the parison is too long, more waste than is absolutely essential is produced, and the process of manufacture consequently becomes unavoidably more expensive.

A further circumstance which makes it necessary to adhere to the correct length of the parison is the fact that at the present time the wall thickness of the parison is frequently subjected to open loop control in accordance with a predetermined programme. This is done by varying the gap width of the outlet orifice during extrusion. If the gap width is larger, the wall thickness increases; if the gap width is smaller, the wall thickness is less. In this way it proves possible to provide the parison with different wall thicknesses over its length, the position of the individual wall thickness regions being suited to particular requirements which may result from the end product required. The programming of the wall thickness and hence the adjustment, which this requires, of the gap width of the outlet orifice are normally subjected to closed loop control as a function of the stroke of the piston which empties the accumulator chamber, a normal length of the parison and a particular position of the latter relative to the blow-mould being assumed. If the length of the parison alters, the individual regions having a particular wall thickness also undergo corresponding changes of their relative position along the longitudinal axis of the parison, so that the end result is that the individual regions no longer occupy the correct position relative to the blow-mould and to the mould cavity present therein.

It is known, in the production of parisons using an extrusion head with an accumulator chamber, to scan the length of the parison, for example by means of a photocell, and to use the data thus obtained to regulate the operation of the apparatus which produces the parisons. This is done bu utilising the deviations from a pre-determined set length of the parison as a signal to change the volume of the accumulator chamber correspondingly. If the parison is too short, more material is accumulated in the accumulator chamber in the course of the subsequent cycle or cycles, whilst if the parison is too long less material is accumulated. This adaption presents no difficulties and is carried out by correspondingly altering the starting position of the piston. The consequence of changing the volume of the accumulator chamber for closed loop control of the length of the parison is that the amount of material required for a parison changes from parison to parison. This is disadvantageous, particularly as it is unavoidable and in many cases more material is used than is inherently necessary. A further disadvantage is that the time which is required for filling the accumulator chamber varies as a function of the particular volume to which the chamber has been set, unless special counter-measures are taken. In any case, this known method of closed loop control of the parison is not able to improve the quality of the end product and/or the economics of the process of manufacture. These known devices, which influence the volume of the accumulator chamber, leave out of account the fact that changes in the length of the parison are hardly attributable, or in any case not attributable to a significant degree, to changes in the density of the thermoplastic.

According to the present invention we provide blow-moulding apparatus for the manufacture of hollow bodies from a thermoplastic material, such apparatus comprising a screw extruder; an accumulator chamber having an inlet orifice positioned to receive thermoplastic material from the screw extruder, the accumulator chamber having a gap-like outlet orifice, a piston movable in said chamber to force the thermoplastic material therein through said outlet orifice, to form a parison, a blow-mould consisting of at least two openable parts, the open mould encompassing the parison and means for adjusting the width of the gap-like outlet orifice as a function of the length of the parison extruded.

With such a construction, the volume of the accumulator chamber and hence the amount of material required for each parison can remain constant and the time required in each cycle, for filling the accumulator chamber can be kept nearly constant.

The closed loop control which is possible with the apparatus according to the invention takes into account the fact that changes in length of the parison, if the volume of the accumulator chamber is constant, are essentially only attributable to changes in the swelling behaviour or relaxation of the thermoplastic material immediately after it passes the outlet orifice of the extrusion head, and these can be compensated by correspondingly changing the gap width of the outlet orifice. It is a particular advantage that, when using the apparatus according to the invention, the parisons, and hence also the end products, possess a consistent weight.

Advantageously adjustment of the gap width of the outlet orifice only takes place after the change in length of the parison has exceeded a pre-determined tolerance range.

Of course it is also possible, with the apparatus according to the invention, additionally to adjust the gap width of the outlet orifice, during extrusion, in accordance with a particular programme for closed loop control of the wall thickness of the parison, so that two closed loop control processes are supposed: firstly, a basic gap width is adjusted, for the purpose of regulating the length of the parison. Secondly, the total gap width during the extrusion process is varied in accordance with a predetermined programme, for the purpose of closed loop control of the wall thickness of the parison. This offers the possibility simply to add the changes in the gap width resulting from the wall thickness programming, onto the basic gap width. A second possibility is to apply the changes in gap width, resulting from the wall thickness programme during the extrusion process, to the basic gap width proportionately to the instantaneous total gap width.

Figure 2:
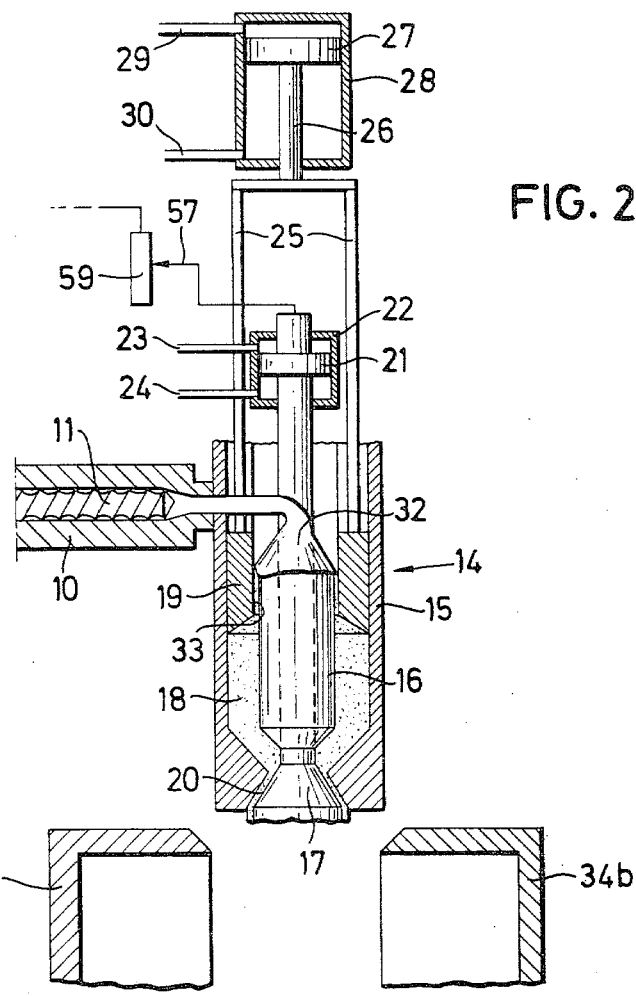
Figure 3:
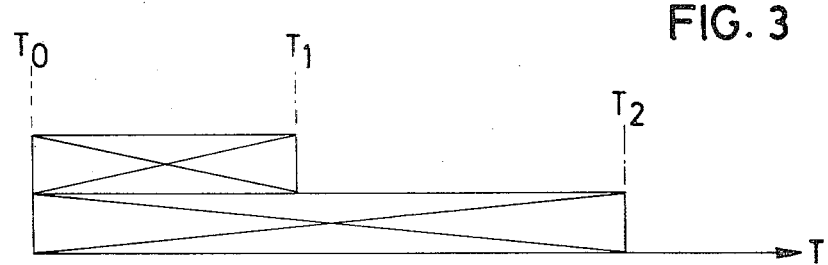

In order that the invention may more fully be understood, the following description is given, merely by way of example, reference being made to the accompanying drawings, in which:

FIG. 1 schematically shows one embodiment of apparatus according to the invention;

FIG. 2 shows a portion of FIG. 1, with certain of the co-operating members occupying a different position and FIG. 3 is a diagram which illustrates the dependence of the correction of the extruder screw speed on the time required to fill the accumulator chamber in the extrusion head.

The apparatus for the manufacture of hollow bodies from a thermoplastic by blow-moulding, shown schematically in FIG. 1 of the drawing, comprises an extruder 10, the screw 11 of which is driven by a motor 12. The thermoplastic material is fed to the extruder from a hopper 13. The extruder 10 is followed by an extrusion head 14 which essentially consists of a cover 15, a stationary mandrel 16, a core located coaxially, and axially displaceable, in the cover, an accumulator chamber 18 and an annular piston 19, which is also axially displaceable to and fro. The core 17, at its lower end, constitutes the inner boundary of an annular gap 20. In its upper terminal region the core 17 is provided with a piston 21 which travels in a cylinder 22. The feed and discharge lines for the pressure medium, normally a hydraulic medium, are marked 23 and 24.

The annular piston 19 is connected, by means of bolts or the like, 25, distributed around its periphery, to the piston rod 26 of a piston 27 which is slidable in a cylinder 28. Feed and discharge lines 29 and 30, for the pressure medium, generally a hydraulic fluid, are provided.

The cover 15 of the extrusion head 14 is provided with an inlet orifice 32 for the thermoplastic, which travels through two mutually facing, downwardly flared channels 32 so as to assume an annular cross-section and flows through the intermediate channel 33 into the accumulator chamber 18 and in doing so pushes the ring piston upwards until the latter reaches its upper terminal position, shown in FIG. 2. To this extent, the construction of the extrusion head conforms generally to the subject of U.S. Pat. No. 3,611,494.

Below the extrusion head 14 is located a blow-mould 34, consisting of two halves 34a and 34b, a blowing mandrel 35 associated therewith also being provided. The latter serves to supply a pressure medium by means of which the parison 31 is blown until it bears against the inner wall of the closed blow-mould. The pressure medium is supplied through a bore 36 in the mandrel 35.

The mode of operation of the apparatus is such that the material plasticised in the continuously running extruder 10 is first brought through the channels 32 and the intermediate channels 33 into the annular accumulator chamber 18, and as the latter is progressively filled the ring piston 33 is displaced upwards into the position shown in FIG. 2. As soon as the piston 33 has reached its adjustable upper position, the piston 27 is subjected, by suitable known means, to pressure medium through the line 29, with the result that the ring piston 33 is moved downwards into its lower terminal position shown in FIG. 1. As it moves downwards, the thermoplastic material contained in the accumulator chamber 18 is forced out through the outlet orifice 20 in the form of a tubular parison 31, the latter being located between the two halves 34a and 34b of the blow-mould 34, which at this moment is at least partially opened. Thereafter—triggered by open loop control pulses, the generation of which will be described later—the blow-mould 34 is closed around the length of parison 31, before or after the mandrel 35 is, or has been, introduced into the lower end of the parison 31. The parison 31 is then distended. Of course it is also possible to use a different construction for the feed of the pressure medium and/or to locate the said feed at a different point, for example above the mould 34.

All these possibilities and measures are known, so that they do not require more detailed description. After the blowing process, the resulting hollow body still remains within the blow-mould for a certain time, required for cooling and solidification of the thermoplastic. The blow-mould is then opened. The finished hollow body, which may still carry some scrap portions which have to be pulled off or cut off is taken out of the mould, so that the latter is now ready to receive the next length of parison 31. This situation is shown in FIG. 2, in which, however, the two parts 34a, 34b of the mould have already travelled along part of their closing stroke.

A photocell 38 is so located under the blow-mould 34 that is corresponding light beam 37 is interrupted by the lower end of the length of parison 31 as soon as the latter has reached its set length. Further, a position indicator 39 is associated with the ring piston 19, the movements of the indicator being dependent on those of the ring piston 19. This position indicator 39 is able to trigger signals, via signal generators 40, 41, in the two terminal positions of the ring piston. In the lower position or the ring piston 19 and hence of the position indicator 39, the latter triggers a signal via the signal generator 40, which indicates that the downward stroke of the ring piston 19, that is to say the stroke in the direction of the outlet orifice 20, which stroke effects the expulsion of the material contained in the accumulator chamber 18, has been completed and accordingly, the formation of the tubular parison 31 has been completed. This signal, coming from the signal generator 40, passes via a lead 43 to an open loop control device 44, which controls a valve 45 provided in the fluid pressure leads 46, 47 of a cylinder 48. The piston 49 travelling in the said cylinder causes the opening and closing of the blow-mould 34 through appropriate movements of the two parts 34a, 34b of the mould. The signal coming from the signal generator 40 applies the pressure medium, supplied through the lead 47, to the piston 49, as a result of which the blow-mould is closed. The mould-half 34a can be indirectly coupled to the piston 49 in a manner which is in itself known. It is also possible to provide the part 34a of the mould with its own cylinder, corresponding to the cylinder 48, which separate cylinder would then also be controlled by the open-loop control device 44.

In addition, the photocell 38 and signal generator 40 are each connected, via a lead 50, 51, to a comparison device 52. This ascertains whether at the moment in which the position indicator 39, and hence the ring piston 19, have reached the position corresponding to the end of the expulsion stroke of the ring piston 19 (FIG. 1), the light barrier 37 has or has not been interrupted by the parison 31. If a signal from the photocell 38 reaches the comparison device 52, it means that the parison 31 is longer than necessary. Alternatively, if no signal arrives from the photocell 38, the parison 31 is too short. In each of the two cases, the comparison device 52 passes a signal to a programmer 53, which leads to an adjustment of the basic gap of the outlet orifice 20. This programmer 53 has also been set to a particular program in respect of the distribution of the wall thickness of the parison 31 over its length.

To clarify the situation, the two broken lines 42a, 42b, which define the maximum width of the basic gap, have been drawn in the programmer 53 in FIG. 1. The curve 54 corresponds to the open loop wall thickness control program. The solid line 42c between the two lines 42a and 42b indicate, together with the line 42b, the actual width of the basic gap at any point, whilst together with the curve 54 it indicates the actual width of the total gap at any time. The width of the latter changes during the extrusion process in accordance with the shape of the curve 54. Accordingly, a correction in the sense of increasing the basic gap—and hence also the total gap at any instant—would result in a shift of the line 42c in the direction of the broken line 42a. A shift in the converse direction, that is to say in the direction of the broken line 42b, would result in a corresponding reduction of the width of the basic gap and hence also of the total gap at any instant.

In addition, an element 55 on which the magnitude of the individual correction steps can be set, is provided between the comparison device 52 and the programmer 53. The wall thickness distribution over the length of the parison 31 normally corresponds to the contour of the finished product, for example in the sense that where the material undergoes its maximum stretching during the process of inflation within the blow-mould 34, a greater wall thickness of the parison 31 is chosen than where the degree of stretching is less. However, it is also entirely possible for other considerations to be the deciding factor in the setting of the wall thickness.

When the position indicator 39 associated with the ring piston 19 occupies its upper terminal position, the upper signal generator 41 triggers a signal which indicates that the accumulator chamber 18 is completely filled. In general, the position indicator 39 and/or the two signal generators 40 and 41 will be adjustable so that the system can be adjusted to the accumulator volume required for the manufacture of a particular type of hollow body.

A further position indicator 57 is mounted on the piston 21 of the core which defines the inner boundary of the annular outlet orifice 20. This position indicator 57 co-operates with a position-signalling device which is, for example, constructed as a potentiometer, and which is connected via a lead 59 to a closed loop control device 60. The latter is connected via leads 61 and 62 to the programmer 53 or to a servo-valve 63 connected in the leads 23 and 24.

The program in respect of the wall thickness of the parison 31, set in the programmer 53 in accordance with the curve 54, is executed as a function of the expulsion stroke of the piston 19. This functional relationship is achieved via the lead 56, which on the one hand is connected to a position-signalling device 64, for example constructed as a potentiometer, with which device the position indicator of the piston 19 of the accumulator chamber 18 co-operates, and, on the other hand, is connected to the programmer 53. The closed loop control device 60 compares the actual position of the core 17, fed in via the position indicator 57 and potentiometer, or the like 58, with its set position, which follows from the position of the piston 19 and the shape of the curve 54 of the programmer 53. If the actual position deviates from the set position, corresponding signals are fed to the servo-valve 63, which lead to a correction of the position of the core 17 and hence of the width of the gap which forms the outlet orifice 20.

In the manner described above it is readily possible, given a constant volume of the accumulator chamber and of the parison 31, to regulate the length of the latter so that economical manufacture of the end product is achieved, since the said product does not contain more material than its function demands, without at the same time having to tolerate a lowering of the quality of the end product. It is above all essential that, since the manufacture of hollow bodies from a thermoplastic always entails large numbers, that the individual specimens of a long run should always exhibit the same structure and hence also the same quality.

It has already been mentioned that after closing the blow-mould 34 around the parison 31, the latter is then blown, after which the resulting product is cooled, leading to solidification of the thermoplastic. Thereafter, the blow-mould 34 can be opened in order to take out the finished product. These events, that is to say the inflation of the parison 31 and the cooling of the resulting product, are always rigidly time-controlled. After the hollow body just produced has been removed from the blow-mould, the pulse 34a, 34b of the mould can be brought into a waiting position which is shown in FIGS. 1 and 2; this means that the two parts of the mould are brought towards one another to the point that the spacing just suffices to enable the mould to receive the next parison 31. This step, wherein the mould assumes the abovementioned waiting position, has the advantage that the closing path which the parts 34a, 34b of the mould then still have to travel, in order to close the blow-mould 34 completely, is very short and thus requires little time.

During the time interval which is required for closing the blow-mould and blowing the parison to give the finished product, which has to be cooled and removed from the mould, the accumulator chamber 18 of the extrusion head 14 is again filled with thermoplastic, for the production of the next parison 31. It is desirable that the time required for this filling process should as accurately as possible match the time required for the occurrence of the abovementioned events relating to the manufacture of the finished article.

It is necessary, because of the usual and unavoidable fluctuations in the amount of thermoplastic delivered by the extruder per unit time, to allow, within the framework of the usual cycle, a certain waiting time of the blow-mould, which time must be so chosen that on the one hand it does not detract, or does not detract to a significant extent, from the productivity of the total apparatus, whilst on the other hand, it allows for the unavoidable fluctuations in the output of the extruder. However, it is necessary to take into account the possibility that the fluctuations in the amount of material expelled by the extruder are so great that they lead to disturbances of the normal sequence of operations, either due to the fact that the accumulator chamber is filled prematurely and hence the parison 31 is extruded prematurely or due to the fact that there is a substantial delay in filling the accumulator chamber 18 and the parison reaches its set length with a corresponding delay. The last-mentioned case would merely have the consequence that the blow-mould 34 is closed later than is inherently provided, since the closing of the mould in every case only starts when the extrusion of the parison 31 has ended, that is to say when the signal generator 40 is actuated by the position indicator 39. In the first-mentioned case, that is to say when the extruder is running too fast and hence the accumulator chamber 18 is emptied significantly too early, the parison may possibly already be extruded through the orifice 20 before the blow-mould 34 is in a position to receive this parison. In order substantially to exclude such irregularities and reduce the waiting time, the following precautionary measures are taken in the embodiment shown in the drawing:

A waiting time, in respect of the movments of the blow-mould, is planned into the total cycle, which is open-loop controlled as a function of time, or at least rigidly in respect of time. According to the representation in FIG. 3, T1 denotes the set moment, in the course of a cycle, at which, if events take place absolutely regularly and as planned, the blow-mould 34 is closed and at the same time grips, and encloses, the parison 31; this means that if the cycle takes place with theoretical accuracy, the blow-mould 34 would have to be ready at time T1 to receive the parison 31. Since, however, such precise sequence of the individual steps of a cycle is virtually never achievable, the waiting time, already referred to, of the blow-mould is planned into the cycle, specifically at the stage when the blow-mould is in the ready position shown in FIG. 2. The blow-mould already assumes its waiting position at time T0 (FIG. 3), that is to say a short time before the set time T1, and in this position is ready to receive the parison 31. Accordingly, the mould can be closed at any time from T0 onwards, as soon as an appropriate signal is received from the signal generator 40. Accordingly, if the parison 31 is extruded before the set time T1, the blow-mould 34 will also be closed before this time. Since closing of the blow-mould before time T1 means that the accumulator chamber 18 is filled more rapidly than envisaged, closing the mould at a time in the interval between T0 and T1 results in closed-loop control of the speed of the screw 11, in the sense of a reduction in speed.

The absolute length of the waiting time T0 to T1 will also depend on the size of the particular apparatus and hence on the size of the hollow bodies to be manufactured since, in general, the time required for a cycle increases as the parison, and hence the end product, become larger.

Of course it can also happen that the parison 31 is only extruded after time T1. In that case, the embodiment shown in the drawing (FIGS. 1 and 3) provides two possibilities. As long as the time at which the blow-mould 34 is closed is only a very short period later—the period being determined by the time T2—than the time T1, there is no effect on the speed of the screw 11. If, however, the time at which the blow-mould 34 is closed by an appropriate signal from the signal generator 40 or from the photocell 38 is later than the predetermined time T2, the speed of the screw 11 undergoes closed-loop control, in the sense of being increased. The planned time interval between T1 and T2, in which there is no effect on the speed of the screw, is intended to prevent the speed of the screw 11 varying practically for each cycle.

The device 66 used for closed-loop control is provided with a timer 67, behind which are wired in parallel two time-function elements 68, 69, of which the time-function element 68 is set to time T1 and the element 69 is set to time T2, which is later than T1. Each of these two time-function elements 68 and 69 is followed by a comparison element 70 and 71 respectively, and a lead 65 coming from the signal generator 41 is also connected to these two switch components 70 and 71. The timer 67 is connected by a lead 72 to a switch, or the like, 73, which is actuated by the blow-mould 34 or one of the parts of the mould as soon as the mould assumes its waiting position at time T0. The sequences which follow the closing sequence, namely distention of the parison 31, cooling of the end product, opening of the blow-mould and the like—can, if appropriate, be open-loop controlled solely as a function of time. At time T0, at which the blow-mould or its parts 34a, 34b assume their waiting position, the switch, or the like, 73 feeds a signal, via the timer 67, to the two adjustable time-function elements 68, 69, from which the signal passes to the two comparison element 70 and 71. When the signal which arrives in the signal generator 41, and which indicates that the accumulator 18 is completely filled, arrives later than the envisaged time T1 to which the time-function element 69 is set, the extruder speed remains unchanged provided that this signal arrives before time T2, set on the time-function element 69. This means that neither of the comparison elements 70 or 71 passes a signal to the downstream components. If however, the signal from the signal generator 41 arrives before time T1, the comparison component 70 actuates another switch component 74, downstream from 70, which reduces the speed of the motor 12, which drives the screw 11, via a suitable final control element 75 which may be, for example, a servo-motor, a motor potentiometer or the like.

If the signal coming from the signal generator 41 arrives later than corresponds to time T2 set on the time-function element 69, T2 being the limit of the maximum time tolerance, the comparison element 71 produces a signal which acts, via the switch component 77 downstream from 71, on the final control element 75 in such a way that the speed of the motor 12 and hence of the screw 11 is increased. The linking member 77 serves to fix the correction parameter, that is to say the extent by which, in each case, the speed of the motor 12 is reduced or increased on receipt of a signal which brings about a change in speed. Any signals coming from the signal generator 41, which arrive between time T1 and T2 have—as already stated—no effects on the speed of the screw.

The result of this is that it is not only the length of the parison 31 which is subjected to closed-loop control via an appropriate adjustment of the basic gap of the outlet orifice 20. Rather, it also ensures that the time required for filling the accumulator chamber 18 and hence for producing the parison 31 fluctuates so little that under normal operating conditions one can virtually consider the time required for filling the accumulator chamber 18, or producing the parison 31, to be constant.

The amount of material coming from the extruder per unit time can also be influenced in other ways than by varying the screw speed. Thus it is possible to fit an adjustable throttle or the like in the flow path between the extruder and the extrusion head, by means of which throttle the amount of material coming from the extruder per unit time can be regulated.

It is important that for the entire closed loop control and open loop control equipment it is possible to use electronic components which, where necessary, can, without problems, be fitted into previously known or already existing electronic closed loop control and open loop control equipment for such apparatus.

Furthermore, it is readily possible, instead of using one photocell 38 and one light beam 37 associated therewith, which can solely sense two alternative states of operation, to use two photocells and light beams or other devices which are capable of sensing and differentiating lengths, so that it is possible to provide a tolerance range, or the like, in respect of the length of the parison. The end result of this is that as long as the length of the parison 31 remains within this tolerance range, no change in the basic gap width occurs. Only if the length becomes less or greater than the limits of this tolerance range is the basic gap altered in one or other direction, in the sense of the explanation given above.

We claim:

1. Blow-moulding apparatus for the manufacture of hollow bodies from parisons formed from a thermoplastic material, said apparatus comprising in combination:
 (a) a screw extruder receiving and extruding a charge of thermoplastic material at a controllable rate;
 (b) an extrusion head having an accumulator chamber of predetermined size having an inlet positioned to receive thermoplastic material from the screw extruder and means indicating said accumulator is filled;
 (c) a gap-like outlet orifice for passing said material from the accumulator chamber;
 (d) a piston within said chamber movable to discharge through said outlet orifice a batch of the thermoplastic material of substantially predetermined size for forming a parison;
 (e) means to move the piston in the chamber to force thermoplastic material therein through said outlet orifice to form a parison while said screw extruder is extruding material into said head and out of said outlet orifice along with the material accumulated in said chamber to form the parison;
 (f) a blow-mould consisting of at least two openable parts, the open mould encompassing the parison;
 (g) means for sensing the length of each parison;
 (h) means responsive to change in parison length sensed by (g) for adjusting the width of the gap-like outlet orifice to correct for changes in length of the parisons; and
 (i) control means responsive to said means indicating the accumulator chamber is filled for controling the rate of extrusion of the material from the extruder during formation of a parison to affect the amount of material per unit time extruded into the accumulating chamber and parison by the extruder and keep the time for producing the parison substantially constant.

2. Blow-moulding apparatus as claimed in claim 1, wherein the screw extruder control comprises an open loop control for controlling the screw extruder speed as a function of the time required for filling the accumulator chamber.

3. Blow-moulding apparatus as claimed in claim 1, wherein the means for controlling the speed of the screw of the screw extruder are such that the cycle of movement of the parts of the apparatus are at least predominantly time controlled, and the waiting time of the blow mould before closing is planned into the cycle of movement.

4. Blow-moulding apparatus as claimed in claim 1, and further comprising means for detecting when the length of the parison extruded reaches a given length corresponding to the length of the blow mould and the screw extruder control means are arranged whereby the degree of change in speed of the screw depends on the degree of deviation of the time in which the parison reaches said give length, from a set point in time which would follow from a rigidly controlled cycle of movement from the blow mould.

5. Blow-moulding apparatus as claimed in claim 1, wherein the means for adjusting the width of the gap-like outlet orifice operate only after a predetermined tolerance range of the change in length of the parison has been exceeded.

6. Blow-moulding apparatus as claimed in claim 1, including additional means for adjusting the width of the gap-like orifice in accordance with a particular program for regulating the wall thickness of the parison over its length.

* * * * *